United States Patent Office 2,789,601
Patented Apr. 23, 1957

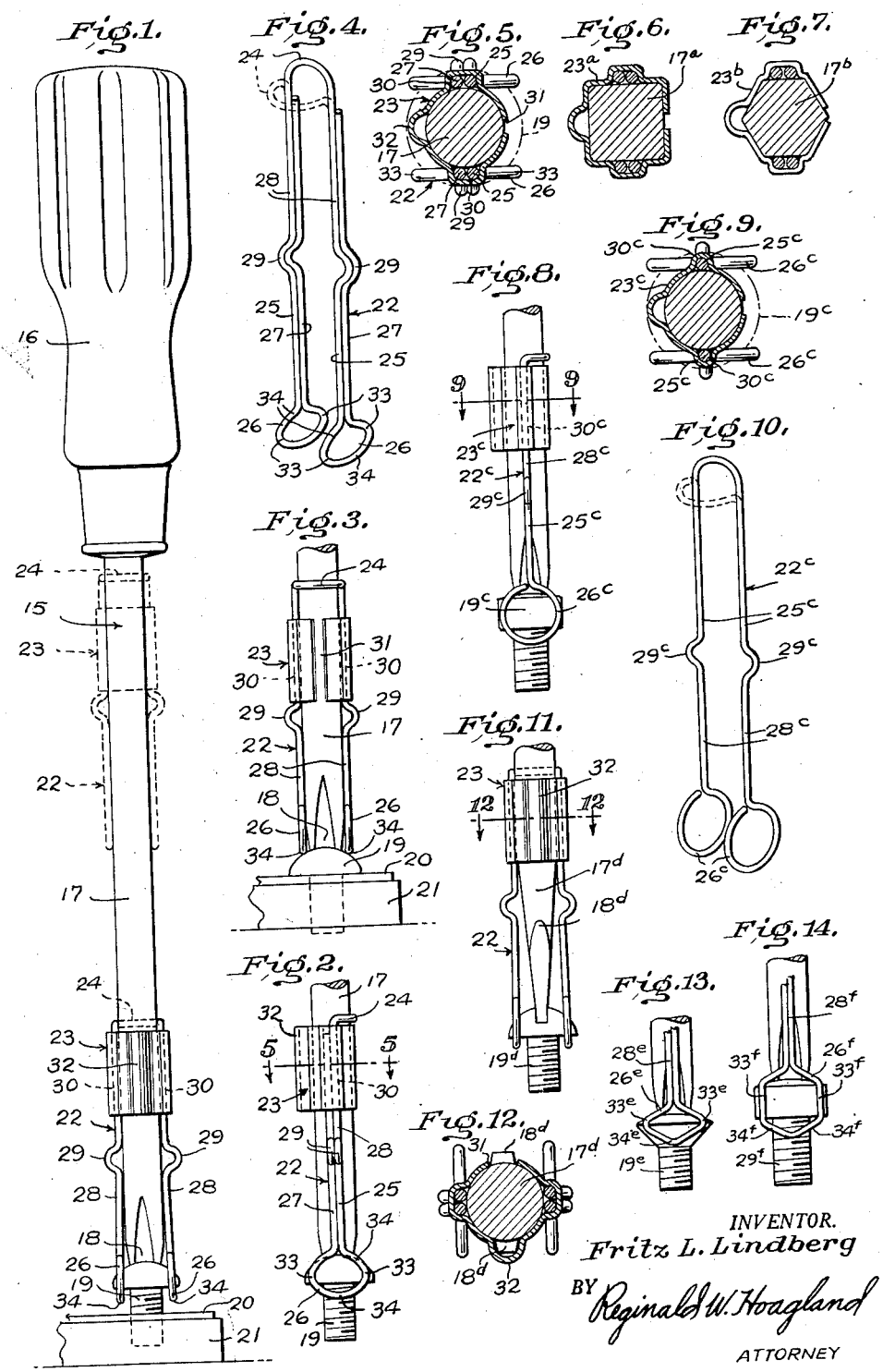

2,789,601

SCREW HOLDER FOR SCREW DRIVERS

Fritz L. Lindberg, Flint, Mich.

Application April 6, 1955, Serial No. 499,665

8 Claims. (Cl. 145—52)

This invention relates to screw holding devices used in conjunction with screw drivers for bodily supporting a screw in driving position on and relative to a screw driver, and it consists in the combination, construction, and arrangement of parts herein described and claimed.

Generally, there is provided a very simple and inexpensive screw holder especially adapted for use as an attachment to existing conventional screw drivers without alterations to either the holder or the screw driver. The screw holder consists essentially of a wire formed in a shape to provide a pair of opposed loop-type jaws into and between which a head of a screw is partially received and held, and a pair of connected and substantially parallel side arms slidably mounted on a split sleeve that is frictionally supported for longitudinal movement on the shank of a screw driver. The size and shape of the two looped portions vary in accordance with the size and type of heads of the screws to be used therewith, but in all instances, opposite sides of the screw head protrude through and are embraced by the loops, and because of the curved and angled relationship of engagement of said loops with said head, said loops are cammed outwardly by said head upon contact of said loops with the object into which the screw is being threaded for releasing the screw during final threading thereof. A novel arrangement, construction, and association of the wire member, split sleeve, and shank of the screw driver yieldably retain the holder parts in different longitudinal positions on the screw driver shank, and finger-engaging portions on both said wire member and split sleeve provide for manual positioning of the holder parts relative to the screw driver shank. The invention contains other novel features which will be brought out in the annexed specification.

It is accordingly an object of the invention to provide a screw holder for screw drivers that supports a screw in driving position on a screw driver during transmittal of the screw to the location of its attachment, supports the screw driver on the screw throughout the major portion of attachment of the screw, and automatically releases its grip on the screw during final attachment of said screw.

Another object of the invention is to provide, in a device of the character set forth, a novel construction which can readily be attached to existing conventional screw drivers without alterations to the device or screw driver.

A further object of the invention is to provide, in a screw holder as set forth above, novel jaws for holding and releasing screws.

A still further object of the invention is to provide, in a screw holder of the above character, novel guide means for supporting screw-holding jaws for yieldable sliding movement lengthwise of the shank of a screw driver.

Still another object of the invention is to provide, in a screw holder of the character set forth, a novel construction and arrangement of finger-engaging portions for manual movement of parts of said holder relative to one another and relative to the screw driver.

It is also an object of the invention to provide a device of the above-indicated character which is extremely simple and substantial in construction, economical to manufacture, and thoroughly efficient and practical in use.

These, together with various auxiliary features and objects of the invention which will later become apparent as the following description proceeds, are attained by the present invention, preferred embodiments of which have been illustrated, by way of example only, in the accompanying drawings, wherein:

Figure 1 is a side view of a Phillips head type screw driver, showing in full lines the improved screw holder thereon and in the act of holding the screw driver in the recess of a Phillips type button head screw, and showing in dotted lines a position of the screw holder when not in use;

Figure 2 is a fragmentary side view of a similar type screw driver and showing the improved screw holder at right angles to that shown in Figure 1;

Figure 3 is a side view similar to Figure 2 of the opposite side from that shown in Figure 1 and showing the holder in released position after the screw has been tightened;

Figure 4 is a perspective view of the wire part before assembly to the split sleeve;

Figure 5 is a cross sectional view taken on line 5—5 of Figure 2, and showing the construction of the screw holder when used with a screw driver having a shank round in cross section;

Figure 6 is a view similar to Figure 5, showing the construction of the screw holder when used with a screw driver having a shank square in cross section;

Figure 7 is also a view similar to Figure 5, showing the construction of the screw holder when used with a screw driver having a shank of hexagon shape in cross section;

Figure 8 is a side view similar to Figure 2 showing a modified form of the invention wherein the pair of arms of the wire member are constructed of a single strand of wire and are looped for use with fillister head or similar type screws;

Figure 9 is a cross sectional view taken on line 9—9 of Figure 8;

Figure 10 is a perspective view of the wire part in the form of invention shown in Figure 8 before assembly to its split sleeve;

Figure 11 is a side view of the form of invention shown in Figure 1, but showing the screw holder on the usual type of screw driver with a wedge-shaped end for engaging in a cross slot in the screw head;

Figure 12 is a cross sectional view taken on line 12—12 of Figure 11 and showing the construction of the split sleeve that permits attachment of the screw holder to this type of screw driver;

Figure 13 is a side view showing the shape of the looped end portions of the screw holder for use with an oval or countersunk head screw; and Figure 14 is a similar view showing another shape of looped end portions for use with cap or fillister head screws.

Referring now more especifically to the accompanying drawing, wherein like numerals designate similar parts throughout the various views, attention is directed first to Figures 1 through 5 wherein it will be seen that there is indicated at 15 a screw driver of the Phillips type having a handle 16 on one end of a shank 17 that is round in cross section and has its other end 18 of the usual pointed X-shaped formation and engaged into a like shaped recess in the head of a screw 19 for imparting turning movement to said screw and thus secure parts 20 and 21 to one another.

The improved screw holder forming the subject of this invention is constructed of but two parts, namely, a spring wire member 22 that engages and disengages the head of the screw 19 and a split sleeve 23 that supports the wire member for longitudinal sliding movement on the shank 17 of the screw driver. The wire member 22 is made by bending a single strand of round wire intermediate its ends to a substantially elongated U-shaped formation having a connecting bight portion 24 and a pair of parallel spaced side runs 25. After forming loops 26 at the other ends of the runs 25, the free end portions of the wire strand provide other parallel spaced runs 27 which extend back and alongside the runs 25 and terminate at locations slightly short of the bight portion 24. Thus, it can be seen that a pair of spaced arms 28, each consisting of a run 25 and a run 27, are provided and that said arms have ends thereof connected by the bight portion 24 while their opposite ends have the loops 26 formed thereon. Intermediate the bight portion 24 and loops 26, both runs 25 and 27 of the arms 28 are abruptly bowed outwardly, as at 29, for purposes to be set forth as the description proceeds.

Prior to laterally bending the bight portion 24 from the position shown in full lines in Figure 4 to the position shown in dotted lines in the same figure, the split sleeve 23 is assembled on the arms 28 of the wire member 22 between the outwardly bowed portions 29 and said bight portion, and as the split sleeve 23 is of less length than the distance between the bowed portions and the bent over bight portion, it can be seen that the wire member and split sleeve are limited in endwise sliding movement relative to one another by said bowed portions and said bent over portion.

The split sleeve 23 is constructed preferably of thin sheet metal formed to a size and shape for snugly engaging at spaced circumferential intervals the cylindrical surface of the shank of the screw driver, there being a pair of directly opposite longitudinal channels 30 formed on its inner surface and extending throughout its length into which the arms 25 are slidably arranged. The slit in the split sleeve, which is designated by the numeral 31, and an outward longitudinally formed humped portion 32 are also directly opposite one another and extend throughout the length of said sleeve at locations substantially ninety degrees from the longitudinal channels. The humped portion 32 and slit 31 not only add and permit resiliency to the thin split sleeve for frictional engagement with the shank of the screw driver, but they also allow attachment of the screw holder to screw driver shanks differing slightly in diameter size. Also the humped portion 32 provides a finger-engaging shoulder for manually sliding the sleeve to different positions along the shank of the screw driver. By referring to Figure 2 of the drawing, it will be observed that the humped finger-engaging shoulder 32 on the split sleeve is at a side of the screw driver opposite to that of the bent over bight portion 24 of the wire member, which permits free access to both for imparting manual sliding movement to either. While the split sleeve has been described as frictionally engaging the shank of the screw driver to support the screw holder in its entirety in different positions along said shank, it is to be understood that the wire member, because of its side arms 28 being in resilient contact with the opposite sides of said shank and with surfaces in the channels 30 of said split sleeve, also is frictionally held, but in a lesser degree, in different positions that are both relative to said split sleeve and said shank.

The pair of loop type jaws 26, as shown in Figures 1 through 5, are yieldably spaced directly opposite one another and are of oval shape with their lengths at right angles to the arms 28 and their rounded ends 33 arranged at opposite sides of said arms and adapted to engage peripheral portions of the heads of button or cap head screws 19. The distance between the rounded ends 33 of each oval loop is slightly less than the diameter of the screw head, thus, the screw head protrudes slightly through the loop and is engaged and embraced by each rounded end of each loop at spaced locations. The slower curved longitudinal sides 34 of the oval shaped loops 26 arch over and under the screw head, as best shown in Figure 2, with the central portion of the side 34 which is under the flat seat of said head being spaced the greatest distance away from said head. This presents angled and curved arrangements of engagement of the loops 26 with the head which cams said loops outwardly and from beneath said head upon and during contact of the central portions of the arched sides 34 with the part 20 through which the screw is being threaded. When the screw has about reached the end of its thread movement and its head is no longer within the confines of the loops, the spring tension to return the loops to their normal positions and their engagement now with the rounded surface of the screw head will impart a sliding movement of the wire member 22 to a position as shown in Figure 3. Not only do the outwardly bowed portions 29 of the arms 28 form stops that engage the split sleeve 23, but they also provide areas of said arms that are more freely flexible and locate said areas at specific points relative to the split sleeve and their looped ends.

In Figures 6 and 7, the cross sectional shapes of the split sleeves 23$^a$ and 23$^b$, respectively, are shown of different configurations for conforming to and frictionally mounting said sleeves for sliding movement on a screw driver shank 17$^a$ that is square in cross section and on a screw driver shank 17$^b$ that is of hexagon shape in cross section, respectively.

The modified form of the invention illustrated in Figures 8, 9, and 10 shows the arms 28$^c$ of the wire member 22$^c$ constructed of a single run 25$^c$ of the strand of wire and circular looped jaws 26$^c$ formed on the ends thereof. The single run 25$^c$ is outwardly bowed, as at 29$^c$, for the same purposes as set forth in the other form of invention, and the channels 30$^c$ in the split sleeve 23$^c$ are of narrower widths than the channels 30 for snugly accommodating said single runs of wire. The loops 26$^c$ are shaped circular for use in conjunction with the heads of fillister head screws 19$^c$ or similar shaped heads as best shown in Figure 8. The jaws are released from their grip on the head of the screw in the same manner as that previously described and for the same purpose, namely, to prevent said jaws from becoming clamped under the head of the screw.

The construction of the improved screw holder shown in Figures 11 and 12 is identical to that previously described in connection with the preferred embodiment of the invention, but is shown as being used on the shank 17$^d$ of an ordinary wedge type screw driver that engages and turns a slotted head screw 19$^d$. Conventional screw drivers of this type usually have their shanks 17$^d$ increased in width at opposite sides a short distance inwardly of their screw-engaging ends, as indicated by the numeral 18$^d$. This greater width would have prohibited the assembly of the improved screw holder over the end of the screw driver if it were not for the longitudinal humped portion 32 and the slit 31 on and in the sleeve 23 through which the outward enlargements on the shank are passed. See Figure 12.

In Figure 13, one of a pair of arms 28$^e$ is shown with its looped jaw 26$^e$ diamond-shaped and with the acute angles 33$^e$ of its four sides arranged equal distances to opposite sides of the arm for gripping the head of either a flat or oval countersunk screw 19$^e$, it being understood that another arm of similar construction is used therewith. The sides joined by the obtuse angles 34$^e$ of both loops that are beneath the screw head function with the peripheral surface of the screw head for camming the looped jaws outwardly during final threading of the screw.

Figure 14 shows one of a pair of arms 28$^f$ with its looped jaw 26$^f$ hexagon-shaped for use with a fillister head screw 29$^f$. Another arm with a similarly shaped looped jaw (not shown) is also used. A pair of spaced sides 33$^f$ of the loop extend parallel with the arm 28$^f$ at opposite sides of the center line of the arm and engage the cylindrical surface of the screw head, while another pair of sides 34 of the loop joined to said first-mentioned pair and joined together at an obtuse angle are arranged beneath the head of the screw and function as previously described.

The improved screw holder may be quickly and conveniently assembled onto the shank of a screw driver by merely inserting the screw-engaging end of the shank of the screw driver into the split sleeve 23 at the end thereof where the bent over bight portion 24 of the wire member 22 is arranged and forcibly sliding the sleeve upwardly on the shank. Frictional engagement of the sleeve with the shank retains the screw holder in both use and non-use positions, as shown in full and dotted lines in Figure 1, with the parallel spaced arms 28 both in contact with or in close proximity to opposite sides of the shank throughout their lengths for sliding movement independent of the split sleeve.

When it is desired to support a screw in driving position on and relative to the screw driver, the screw holder is slid outward on the shank of the screw driver until the looped jaws 26 are beyond the end of the shank and the space between said looped jaws is free of obstruction by said shank. The head of the screw is then forced between the arms 28 and into the loops 26 of the jaw by applying pressure on the screw and springing the free end of the arms slightly away from each other, their points of flexing being at the bowed portions 29, after which, both parts 22 and 23 of the screw holder are slid inwardly on the shank 17 until stopped by the positioning of the screw-engaging end 18 of the shank in the recess in the head of the screw. The frictional engagement of the split sleeve 23 with the shank, engagement of the screw with the shank and loops 26 of the wire member 22, and engagement of the split sleeve with the bent over bight portion 24 of the wire member hold the screw in driving position on the end of the screw driver.

The screw will remain held on the shank of the screw driver during the major portion of threading of said screw, and not until the loops 26 come in contact with the object into which the screw is being threaded will the screw be released from the holder. The curved and angled relationship of engagement of the loops 26 with the screw head cams the loop ends of the arms 28 outwardly as the screw is further threaded into the part, and the wire member is prevented from moving therewith. Thus, frictional engagement of the wire member with the shank of the screw driver and with the split sleeve is overcome, and said wire member is moved inwardly on and relative to the shank and split sleeve to disengage the head of the screw from within the loops of the jaws. It therefore can be seen that a screw will be firmly held on a screw driver during transmittal of the screw to location of its attachment, supported on a screw driver throughout the major portion of its threading, and automatically released from the holder during its final threading.

In view of the foregoing description taken in conjunction with the accompanying drawings, it is believed that a clear understanding of the construction, operation, and advantages of the screw holder will be quite apparent to those skilled in this art.

It is to be understood, however, that even though there is herein shown and described preferred embodiments of the invention, various changes may be made without departing from the spirit and full intendment of the invention.

What is claimed is:

1. A screw holder for screw drivers comprising a thin sheet metal split sleeve snugly encircling the shank of a screw driver for frictional sliding movement longitudinally on said shank, said sleeve having a pair of longitudinally extending channels formed in the inner surface thereof directly opposite one another by reverse bending of the sheet metal; and a substantially U-shaped wire member having the spaced parallel arms thereof slidable in said channels and arranged in close proximity to opposite sides of the screw driver shank, said U-shaped wire member having the bight portion thereof turned laterally to one side and extending partially around said shank, and loops formed on the free ends of said U-shaped wire member for engaging opposite sides of the head of a screw.

2. A screw holder as defined in claim 1, wherein the split sleeve also is humped longitudinally thereof and on a side opposite the slit in said sleeve.

3. A screw holder as defined in claim 2, further characterized by having the laterally bent bight portion of the U-shaped wire member on the same side as that of the slit in the sleeve.

4. A screw holder as defined in claim 1, wherein said arms are abruptly bowed outwardly at locations spaced slightly beyond said sleeve and provide stops that engage one end of said sleeve for limiting inward sliding movement of said wire member relative to said sleeve.

5. A device as defined in claim 1 wherein said loops are of substantially elliptical configuration with their major axes extending at right angles to the arms, and having their opposite slower curved portions which extend between points of engagement with said head spaced from said head.

6. A screw holder for screw drivers comprising a sleeve encircling the shank of a screw driver and frictionally slidable thereon, said sleeve having a pair of longitudinally extending channels formed in the inner surface thereof directly opposite one another, an a substantially U-shaped member constructed of a single strand of wire and having each of its spaced parallel arms consisting of a pair of closely associated parallel runs of the wires, said arms being slidable in the channels of said sleeve, said single strand of wire having its ends terminating adjacent the bight portion of the U-shaped wire member and said bight portion turned laterally at the terminals of the wire, and loops formed at the free ends of the U-shaped wire member during turning of the wire strand back upon itself to provide a pair of wire runs for each arm, said loops being adapted to engage opposite sides of the head of a screw.

7. A screw holder as defined in claim 6, wherein at least one run of the two runs of wire forming each arm of the U-shaped wire member is abruptly bowed outwardly at a location spaced slightly forward of the sleeve for limiting inward sliding movement of the wire member relative to the sleeve.

8. A screw holder for screw drivers comprising a sleeve encircling the shank of a screw driver and frictionally slidable longitudinally thereon, a pair of substantially parallel spaced spring arms carried by said sleeve and longitudinally slidable for limited movement relative to said sleeve and screw driver shank, said arms being arranged in close proximity to opposite sides of said shank and having end portions thereof projecting forwardly of said sleeve, and screw head-engaging jaws on the forward ends of said arms, said jaws being of looped formation and of a size for partially receiving and engaging opposite sides of the head of a screw, said limited longitudinal movement of said arms relative to said sleeve being substantially equal to the difference of positions of said jaws onto and immediately out of holding engagement with the head of the screw, said arms being limited in their movement in one direction by being joined together and said joined portion abutting one end of the sleeve, and said arms being limited in their movement in the opposite direction by being abruptly bowed at locations spaced slightly beyond the other end of said sleeve for engagement with said other end of said sleeve.

References Cited in the file of this patent

UNITED STATES PATENTS

| 351,751 | Douglas | Nov. 2, 1886 |
| 729,830 | Yates | June 2, 1903 |
| 2,116,651 | Ackerson | May 10, 1938 |
| 2,207,315 | Dodd et al. | July 9, 1940 |

FOREIGN PATENTS

| 16,453 | Great Britain | July 25, 1896 |
| 15,915 | Norway | July 4, 1906 |